J. T. MONTGOMERY.
AUTOMOBILE PULLER AND POWER MECHANISM.
APPLICATION FILED APR. 24, 1920.
1,406,752. Patented Feb. 14, 1922.
2 SHEETS—SHEET 1.
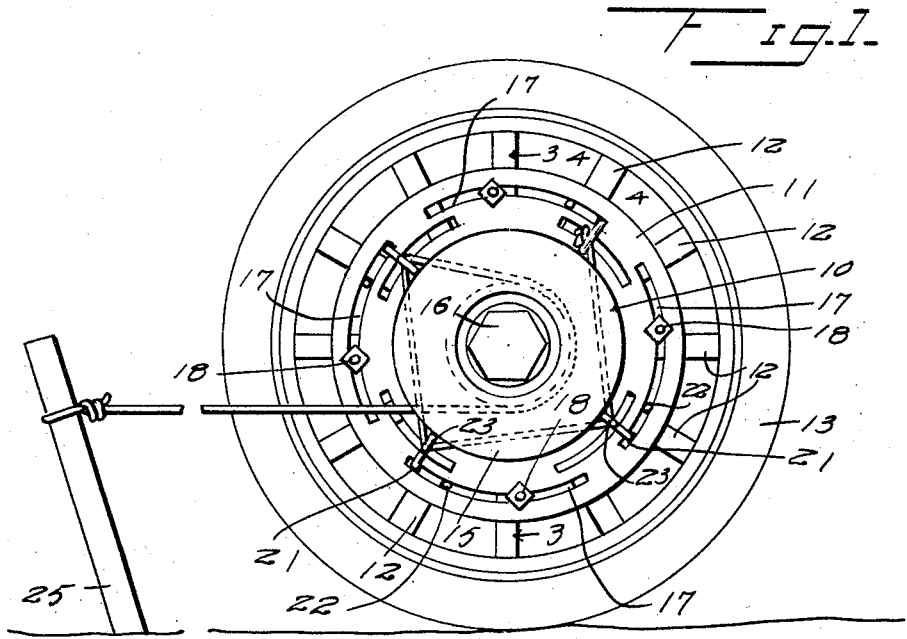
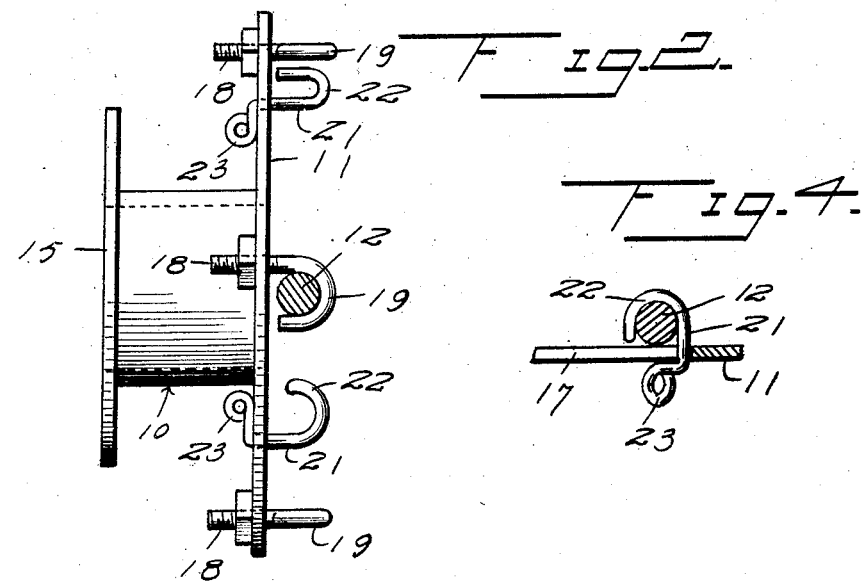
INVENTOR.
J. T. Montgomery
BY
ATTORNEY.

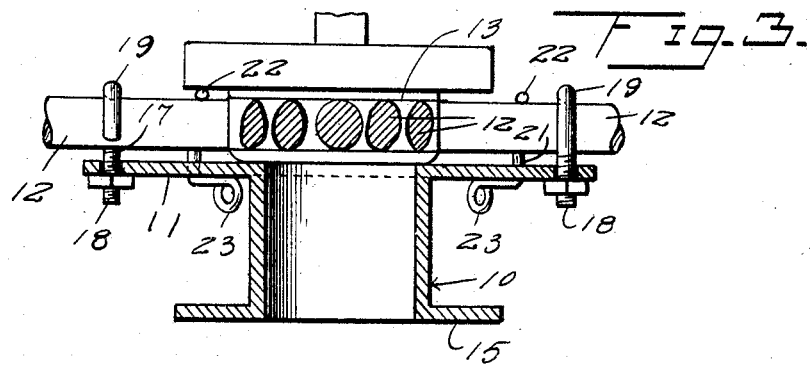
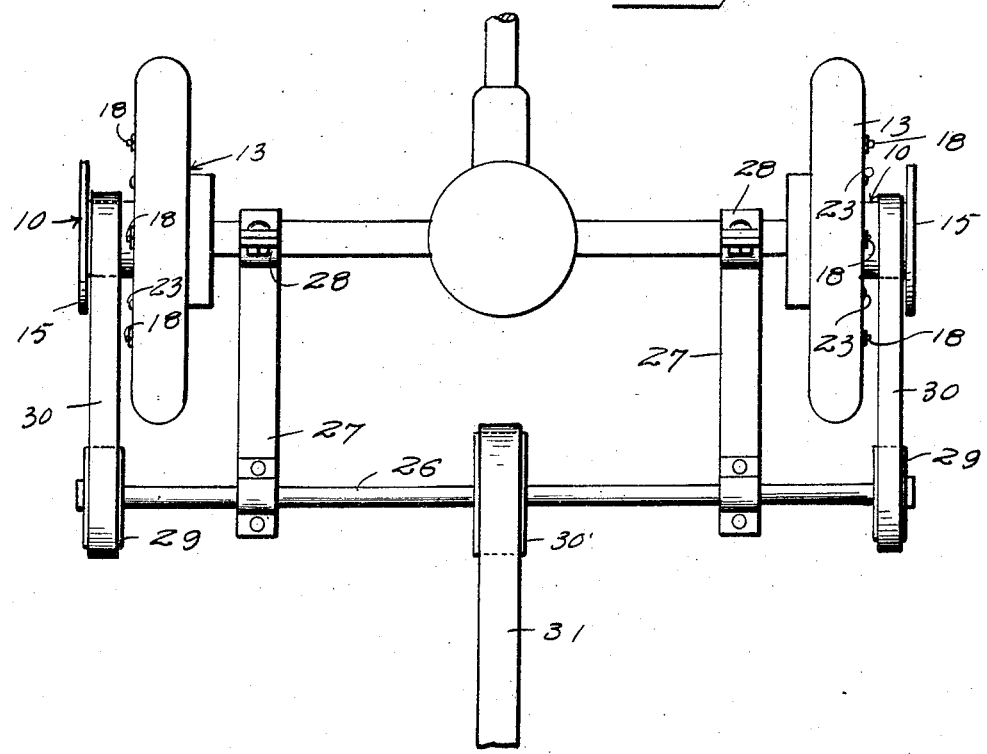

UNITED STATES PATENT OFFICE.

JOHN T. MONTGOMERY, OF VERONA, MISSOURI.

AUTOMOBILE PULLER AND POWER MECHANISM.

1,406,752.  Specification of Letters Patent.  Patented Feb. 14, 1922.

Application filed April 24, 1920. Serial No. 376,315.

*To all whom it may concern:*

Be it known that I, JOHN T. MONTGOMERY, a citizen of the United States, residing at Verona, in the county of Lawrence and State of Missouri, have invented certain new and useful Improvements in Automobile Puller and Power Mechanism; and I do hereby declare the following to be a full, clear, and exact description of the invention, such as will enable others skilled in the art to which it appertains to make and use the same.

The object of the invention is to provide simple and efficient means in the form of an attachment applicable to automobiles and similar motor driven vehicles whereby they may readily be drawn out of ditches and over bad places in the road by their own power and also whereby power may be derived from the motor of the vehicle for driving machinery in the shop or on the farm to dispense with separate engines or motors for this purpose, and with these objects in view the invention consists in a construction and combination of parts of which a preferred embodiment is shown in the accompanying drawings, wherein—

Figure 1 is a side view of the device applied in the operative position to an automobile driving wheel.

Figure 2 is a front elevation of the same.

Figure 3 is a sectional view taken on the plane indicated by the line 3—3 of Figure 1.

Figure 4 is a detail sectional view to show the connection of the cable guides with the attaching disk and drive wheel spokes.

Figure 5 is a plan view showing the use in connection with a pair of the wheel attachments of a transmission shaft by which power may be communicated to machinery to be driven.

The device consists essentially of a pulley or drum 10 having an attaching disk 11 for arrangement in contact with the spokes 12 of an automobile drive wheel 13, said drum or pulley having an outer guard flange 15 and being hollow so as to be fitted over the hub 16 of the drive wheel.

The attaching disk is provided with a plurality of circumferential or curved slots 17 in which are arranged anchor bolts 18 having inner terminal hooks 19 for engagement with the spokes of the wheel, the outer extremities of said bolts being fitted with nuts 20 by which the disk may be securely fastened to the wheel.

Also extending through said slots are the stems 21 of hangers having hooks 22 for engagement with the wheel spokes. The inner extremities of the stems being fitted with guide eyes 23 through which extend a cable 24, one end of which is preferably secured as at 25 to one of the eyes, and which is adapted to be reeled upon the drum or pulley. The opposite extremity of the cable being provided with a stake 25' adapted to be driven into the ground at a suitable distance in advance of the machine which is stalled in a ditch or depression of the road. When the drive wheel is turned by means of the motor the cable will be taken up to forcibly draw the machine forward until it reaches a portion of the road surface upon which the treads of the drive wheels will secure the proper purchase to enable the car to proceed in the ordinary way.

It will be understood that the device is compact in form and construction and may readily be stored in a small space and may be applied to the drive wheel of the car when needed with a minimum of effort and loss of time on the part of the operator. The construction and arrangement of the brackets which support the running eyes for the cable are such that the strain thereon due to the tension of the cable increases the security of the engagement with the wheel, so that the slipping thereof is prevented and a minimum of strain is therefore applied to the means by which the drum or pulley is secured to the drive wheel of the vehicle.

When it is desired to use the attachment as a means of communicating motion to machinery to be driven, it is preferable to duplicate the same with reference to both of the vehicle drive wheels, and to mount a shaft 26 transversely in rear of the vehicle as by means of bearing brackets 27 having clamps 28 for engagement with the axle of the vehicle. The extremities of said shaft being provided with pulleys 29 connected by belts 30 with the drums or pulleys of the attachment. The shaft at an intermediate point is provided with a driving pulley or belt wheel 30' from which a belt 31 may extend to the device or machine to be operated.

The shaft attachment with its pulleys serving as a transmission mechanism obviously may be mounted with facility upon the rear of the machine through the agencies indicated, without involving any considerable amount of effort or loss of time upon the part of the operator and without the necessity of changing the construction of the machine. The device when not in place will permit of the usual functioning of the machine, and yet by simply jacking up the rear axle of the car it is possible by means of the device as indicated to drive any of the lighter farm implements or machines or to operate saws, lathes or other machines in a shop to take the place of stationary motors ordinarily employed for this purpose.

What is claimed is:—

In combination with a drive wheel, a power drum attachable thereto, a cable associated with the drum, a hanger movably extending through the drum, a hook engaging the wheel, a hanger having a portion extending at an angle to the hook and engaging the drum on the opposite side to the hook, and said portion having an eyelet through which the cable passes.

In testimony whereof I affix my signature, in presence of two witnesses.

JOHN T. MONTGOMERY.

Witnesses:
S. K. GIBSON,
KATHERINE GREGG.